(12) United States Patent
Khare et al.

(10) Patent No.: US 12,124,968 B2
(45) Date of Patent: *Oct. 22, 2024

(54) INFORMATION SUPPORT SYSTEM USING ARTIFICIAL INTELLIGENCE

(71) Applicant: American Express Travel Related Services Company, Inc., New York, NY (US)

(72) Inventors: Vishal Khare, Meerut Cantt (IN); Tanisha Kukreja, Kurushetra (IN); Bhargavi Nuvvula, Bengaluru (IN); Madhusudan Pemmaraju, New Delhi (IN); Satyaki Sanyal, Kolkata (IN); Kunal Upadhay, Bengaluru (IN)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/125,638

(22) Filed: Mar. 23, 2023

(65) Prior Publication Data

US 2023/0244961 A1 Aug. 3, 2023

Related U.S. Application Data

(63) Continuation of application No. 16/178,404, filed on Nov. 1, 2018, now Pat. No. 11,663,501.

(51) Int. Cl.
| | | |
|---|---|---|
| *G06N 5/025* | (2023.01) | |
| *G06F 40/205* | (2020.01) | |
| *G06F 40/279* | (2020.01) | |
| *G06F 40/30* | (2020.01) | |
| *G06F 40/40* | (2020.01) | |
| *G06N 5/01* | (2023.01) | |
| *G06N 5/04* | (2023.01) | |

(Continued)

(52) U.S. Cl.
CPC ........... *G06N 5/025* (2013.01); *G06F 40/205* (2020.01); *G06F 40/279* (2020.01); *G06F 40/30* (2020.01); *G06F 40/40* (2020.01); *G06N 20/00* (2019.01); *G10L 15/22* (2013.01); *G06N 5/01* (2023.01); *G06N 5/041* (2013.01)

(58) Field of Classification Search
CPC .......... G06N 5/025; G06N 20/00; G06N 5/01; G06N 5/041; G06F 40/205; G06F 40/279; G06F 40/30; G06F 40/40; G10L 15/22; G06Q 30/016
See application file for complete search history.

(56) References Cited

U.S. PATENT DOCUMENTS

2014/0149411 A1* 5/2014 Anand ............... G06F 16/35
707/737
2017/0091312 A1* 3/2017 Ajmera ............. G06F 16/3329
(Continued)

*Primary Examiner* — Quoc A Tran
(74) *Attorney, Agent, or Firm* — Thomas | Horstemeyer, LLP (57) ABSTRACT

A system for automated information support processing is disclosed. The system may receive a natural language information support request from a plain text input channel. The system may determine a first user intent based on the information support request. The system may compare the first user intent with a set of support rules. The system may determine a dispositioned outcome based on the set of support rules and the user intent. The system may return the dispositioned outcome.

20 Claims, 3 Drawing Sheets

(51) Int. Cl.
  *G06N 20/00* (2019.01)
  *G10L 15/22* (2006.01)

(56) References Cited

U.S. PATENT DOCUMENTS

2020/0057946 A1* 2/2020 Singaraju ............... G06N 20/00
2020/0351227 A1* 11/2020 Smullen ................. H04L 67/02
2020/0364411 A1* 11/2020 Evermann ............... G06F 40/35

* cited by examiner

INFORMATION SUPPORT SYSTEM USING ARTIFICIAL INTELLIGENCE

CROSS-REFERENCE TO RELATED APPLICATIONS

This application is a continuation of, and claims priority to and the benefit of, copending U.S. patent application Ser. No. 16/178,404, entitled "INFORMATION SUPPORT SYSTEM USING ARTIFICIAL INTELLIGENCE" and filed on Nov. 1, 2018, which is incorporated by reference as if set forth herein in its entirety.

FIELD

The present disclosure generally relates to systems and methods for automating information support systems.

BACKGROUND

Traditional methods of automated inquiry and information support tend to employ decision tree structures. The decision tree structures often direct a user down a branching path comprising multiple levels defined by a filtering statement or question set, with each subsequent level narrowing the general inquiry to a particular problem statement. A user may select from one or more answer choices at each level adding information to define the nature of the problem. A technical problem exists in that an improper or faulty selection of an answer choice may result in an incorrect problem statement and may require the user to reset to the highest level of the decision tree. In this regard, defining a problem by traditional decision tree methods is usually time consuming, demand a relatively large number of user inputs, and may be intolerant of informational faults.

SUMMARY

In various embodiments, systems, methods, and articles of manufacture (collectively, the "system") for automated information support processing are disclosed. The system may receive a natural language information support request from a plain text input channel. The system may determine a first user intent based on the information support request. The system may compare the first user intent with a set of support rules.

The system may determine a dispositioned outcome based on the set of support rules and the user intent. The system may return the dispositioned outcome. In various embodiments the system may extract a user persona.

In various embodiments, the system may extract recognizable parts of speech and preprocess the recognizable parts of speech to produce a preprocessed data. The system may lemmatize the preprocessed data to determine a lemma of the recognizable parts of speech. The system may normalize the preprocessed data based on the lemmatizing to produce a normalized data and may store the normalized data as intent data.

In various embodiments, the system may also calculate a Term Frequency-Inverse Document Frequency (TFIDF) score for each word of each of a first plurality of root nodes and each of a corresponding first plurality of branch nodes of a set of information support rules. The system may compare a TFIDF score of the normalized data with each of the TFIDIF scores of each of the first plurality of root nodes and each of the corresponding first plurality of branch nodes. The system may return a cluster of rules data comprising a second plurality of root nodes and a second plurality of branch nodes based on the comparing. In various embodiments, the system may prune the cluster of rules data based on the user persona.

In various embodiments, the system may apply a selection algorithm to the cluster of rules data. The system may calculate a relatedness score for each of the second plurality of root nodes and the second plurality of branch nodes of the cluster of rules data based on the selection algorithm. The system may select a node from the cluster of rules data based on at least one of the selection algorithm and a relatedness score of the selected node. The system may compare the relatedness score of the selected node to a relatedness threshold and may return one of the selected node data or a default response based on the comparison.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In various embodiments, the system may provide a greater level of sophistication and control for information support systems. Benefits of the present disclosure may apply to any suitable use of branching definition trees. For example, the present disclosure may apply in sales contexts, as well as in information requests or support contexts.

While prior art systems typically include the technical problem of demanding multiple user inputs to define a problem, the current system provides a technical solution by defining a problem statement on the basis of a single natural language input (or minimal inputs) comprising a user intent. In this regard, the system may also reduce the cost of development or system processing time for problem definition by reducing input volume and not requiring additional hardware development or demanding additional information flow. The system may reduce the process time an information support process is engaged by a user. The system may also reduce redundant input requests, thereby reducing a demand for system resources. The system may simplify information support processing and enhance user experience by decreasing a number of user interactions.

This process improves the functioning of the computer. For example, the process increases the reliability and speed of information support request processing by reducing a number of user inputs and/or bypassing a number of user input requests. In various embodiments, reducing the number of user inputs decreases the number of cases where an information support request is abandoned. By reducing a number of abandoned information support request cases, network calls are reduced for revived cases and storage overhead for abandoned cases is reduced. In this regard, the processes described herein may decrease processing overhead of computing systems comprising information support system processors. In various embodiments, the processes described herein may increase network availability by tending to reduce front end and back end process calls and/or network hops. The processes may also save processing resources including CPU time, memory resources, and network resources.

Figure 1:
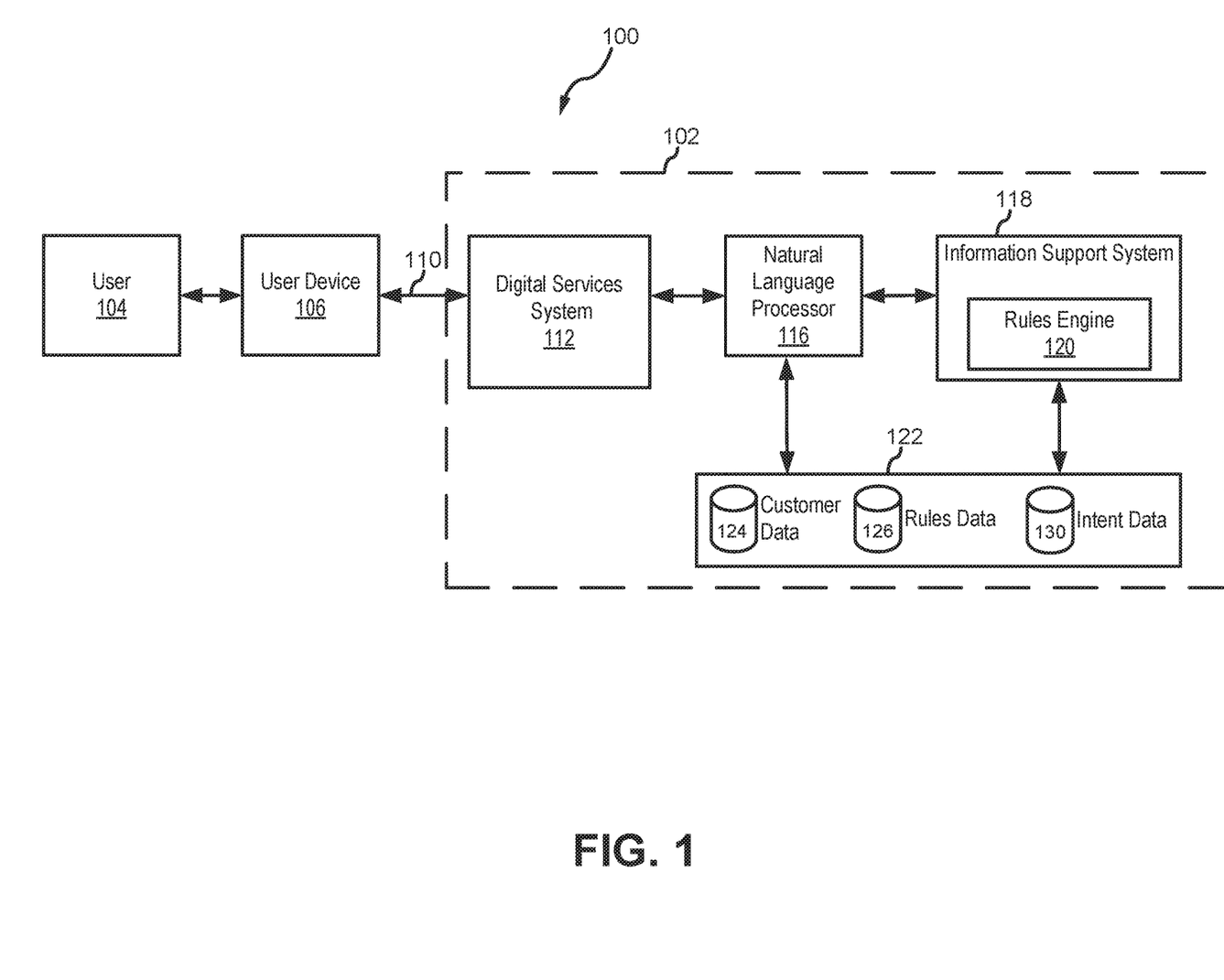
FIG. 1 is a block diagram illustrating various system components of a system for automated information support processing, in accordance with various embodiments.

In various embodiments, and with reference to FIG. 1, a system 100 may comprise an issuer system 102, a customer 104 (e.g., a user), and a user device 106. In various embodiments, issuer system 102 may further comprise a Digital Services System (DSS) 112 which may comprise interface modules such as, for example, Application Programming Interfaces (APIs), an Natural Language Processor (NLP) 116, an information support system 118 which may comprise a rules engine 120, and a database 122. Any of these components may be outsourced and/or be in communication with issuer system 102.

In various embodiments, database 122 may comprise any number of data elements or data structures such as customer data 124, rules data 126, and intent data 130. User device 106 may comprise software and/or hardware in communication with issuer system 102 via network 110. In various embodiments, network 110 may comprise hardware and/or software configured to allow user 104, a prospective customer, a transaction account owner, and/or the like, access to issuer system 102.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein.

In various embodiments, user device 106 may comprise hardware and/or software configured to allow user 104 access to system 100. For example, user device 106 may comprise any suitable device that is configured to allow a user to communicate with a network and issuer system 102 via network 110. User device 106 may include, for example, a personal computer, personal digital assistant, cellular phone, kiosk, virtual assistants (e.g., Amazon Echo, Google Home, Apple HomePod, etc.) and/or the like. User device 106 may allow a user to communicate with issuer system 102 to input elements of customer data 124 and intent data 130, receive and communicate responses from system 102, and transmit a natural language support request, a natural language answer, and/or any other suitable task. User device 106 may be in electronic and/or operative communication with issuer system 102. In this regard, user device 106 may comprise any suitable hardware and/or software components capable of sending and receiving data, for example, a personal computer, personal digital assistant, cellular phone, kiosk, and/or the like. In various embodiments, user device 106 may transmit a natural language support request or a natural answer comprising one or more user intents to issuer system 102 via network 110.

In various embodiments, issuer system 102 may be configured as a central network element or hub to access various systems, engines, and components of system 100. Issuer system 102 may comprise a network, computer-based system, and/or software components configured to provide an access point to various systems, engines, and components. Issuer system 102 may be in operative and/or electronic communication with user device 106, DSS 112, NLP 116, information support system 118, rules engine 120, and/or database 122. In this regard, issuer system 102 may allow communication from user device 106 to systems, engines, and components of system 100. In various embodiments, issuer system 102 may receive device identity (e.g. fingerprinting) data from user device 106. In various embodiments, device fingerprinting data may be stored as customer data 124.

In various embodiments, database 122 may be configured to store and maintain data relating to user 104, such as device fingerprinting data, as customer data 124. For example, customer data 124 may comprise customer device information, customer interaction data and/or clickstream data, customer account data, customer identity data, and/or the like. Database 122 may store the customer data 124 using any suitable technique described herein or known in the art. Customer data 124 may be in operative and/or electronic communication with DSS 112, NLP 116, information support system 118, and/or rules engine 120. In various embodiments, customer data 124 may be written to database 122 in response to determining a user intent described in greater detail below.

In various embodiments, database 122 may be configured to store and maintain rules data 126 relating to support rules used by rules engine 120 in prompting questions and returning dispositions. Rules data 126 may comprise data such as questions, answer arrays, support solutions, intent correlation arrays, intent clusters, intent nodes, branch and/or leaf intents, and other data defining a decision tree structure. Database 122 may store the rules data 126 using any suitable technique described herein or known in the art. Rules data 126 may be in operative and/or electronic communication with DSS 112, NLP 116, information support system 118, and/or rules engine 120.

In various embodiments, rules data 126 may include a plurality of question and answer sets including various dispositioned outcomes. Each question and answer array may be predefined in accordance with a decision tree structure (e.g., a set of support rules). The decision tree may govern a related technical support process flow which guide a user from an information support request (e.g., a problem statement) toward a dispositioned outcome (e.g., a solution to the problem statement). Each of the plurality of sets begin at a root node and branch to related branch nodes. As will be appreciated, the decision tree comprises multiple branching nodes each representing a support rule corresponding to a user intent which may be identified by a unique intent ID. In this regard, the dispositioned outcome defines the terminus of the branching path of links followed based on a determined user intent corresponding to each of the related branch nodes. The dispositioned outcome may represent a solution to the natural language information support request which may vary as a function of the business rules set. The set of business rules may be stored in database 122 as rules data 126. As will be appreciated, the system may determine one or more user intents (e.g., a first user intent, a second user intent, a third user intent) as the system works from the root node along related branch nodes. In various embodiments, the system may prompt the user 104 for input via user device 106 to determine a user intent for each branch node.

In various embodiments, database 122 may be configured to store and maintain intent data 130. For example, a plurality of intent elements derived from a parsed natural language information support request or answer statement and/or other such similar data. Intent data 130 may be stored in database 122 using any suitable technique described herein or known in the art. Intent data 130 may be in operative and/or electronic communication with DSS 112, NLP 116, information support system 118, and/or rules engine 120 and may be associated with customer data 124. In various embodiments, intent data 130 may be written to database 122 in response to parsing a natural language information support request and/or a natural language answer.

Figure 2A:
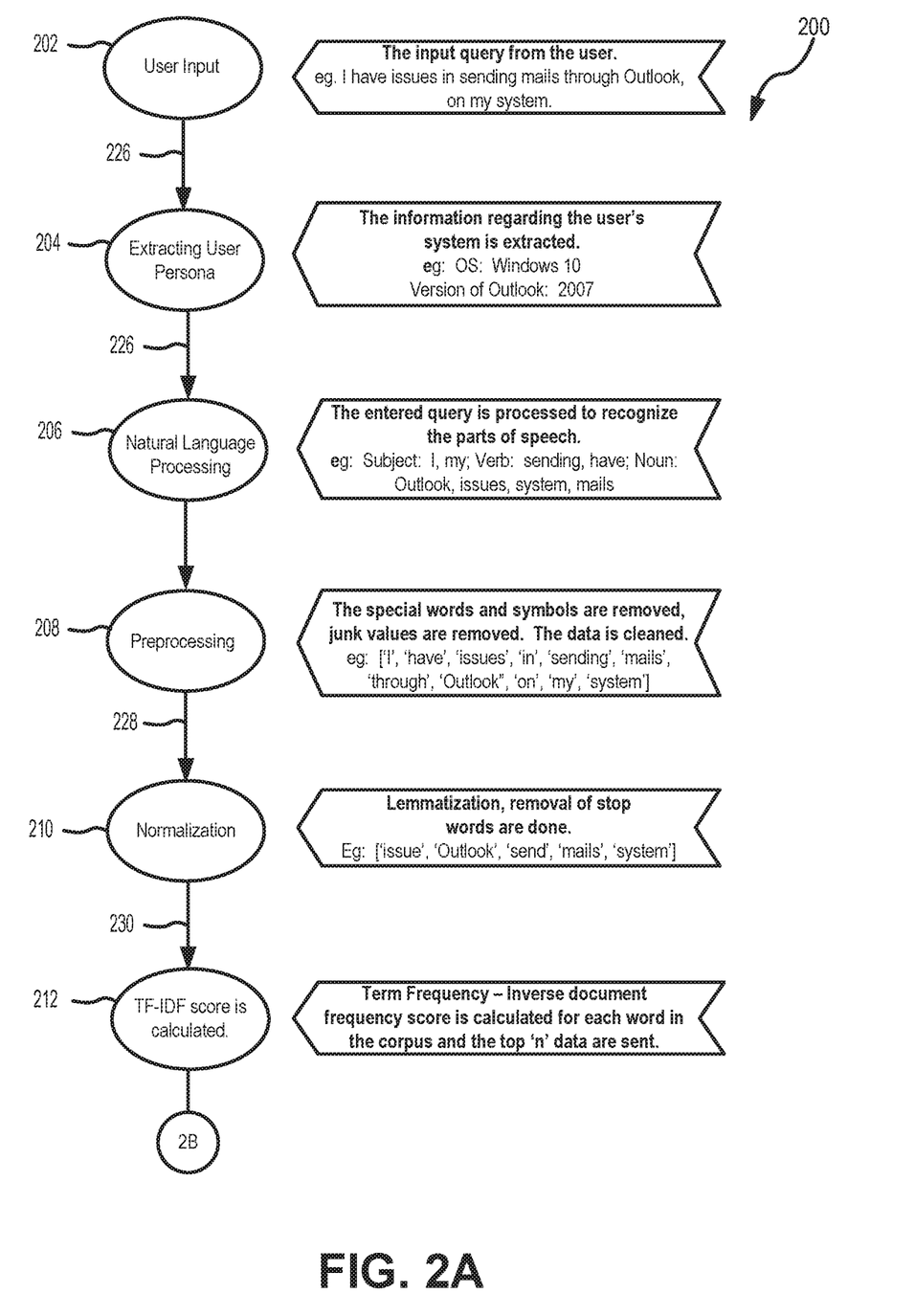
FIG. 2A illustrates a process flow for automated information support processing, in accordance with various embodiments.
Figure 2B:
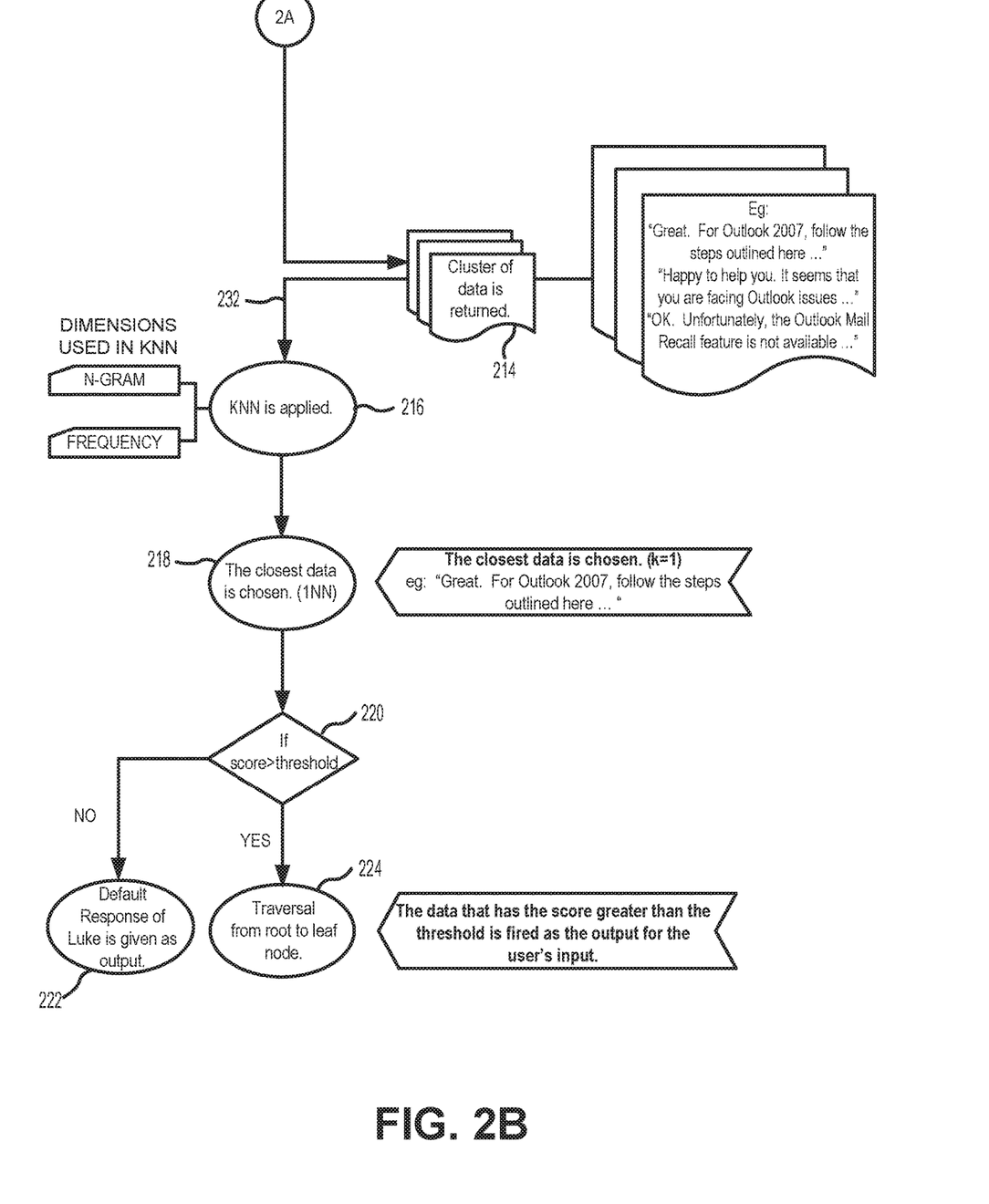
FIG. 2B illustrates a process flow for automated information support processing, in accordance with various embodiments.

In various embodiments, and with additional reference to FIG. 2, user 104 may input a natural language information support request 226 (step 202) through a plaintext channel of user device 106. In various embodiments, an information support request may comprise a natural language text which may, for example, be of the form "I have issues in sending mails through Outlook, on my system." In response, DSS 112 may capture the information support request 226. DSS 112 may also may extract a user persona from the user device 106 (step 204). For example, the user persona may be extracted via an API with the interaction channel (e.g., web chat interface and/or the like) or via an association with a user persona database. In various embodiments, the user persona may comprise information regarding the hardware and software elements of user device 106 such as, for example, a list of installed software, a list of installed hardware, software versions, operating environment data, and/or the like. DSS 112 may store the user persona as customer data 124 in database 122.

In various embodiments, the system may determine a user intent based on the information support request 226. More specifically, the DSS 112 may pass the information support request 226 to NLP 116 for additional processing. The NLP 116 may process the information support request 226 to extract recognizable parts of speech such as, for example, a subject, a verb, a noun, and/or the like (step 206). The NLP 116 may further process the information support request 226 in a preprocessing operation to remove data such as, for example, special words and symbols, junk values, and/or the like to produce preprocessed data 228 (step 208). Step 208 may include a data cleaning operation. The NLP 116 may further process preprocessed data 228 via a normalization process (step 210). Step 210 may include a lemmatization process and removal of stop words. For example, NLP 116 may determine the lemma of the extracted recognizable speech based on an intended meaning and context of the natural language information support request 226. Step 210 may output a normalized data 230 and NLP 116 may pass the normalized data 230 to the information support system 118 for further processing as described below. The system may store the normalized data 230 in association with the information support request 226 as intent data 130.

In various embodiments, the system may compare the first user intent with the set of support rules. Information support system 118 may calculate a Term Frequency-Inverse Document Frequency (TFIDF) score for each word in each root node and each branch node and may calculate a TFIDF score for the normalized data (step 212) of a set of information support rules. Step 212 may include rules engine 120 comparing the TFIDF score of each of the root node and branch nodes with the TFIDF of the normalized data. In various embodiments, rules engine 120 may retrieve a cluster of rules data 232 comprising root nodes and related branch nodes based on the comparison.

Rules engine 120 may return the cluster of rules data 232 to the information support system 118 for further processing (step 214). For example, rules engine 120 may apply a TFIDF score threshold which may be a function of the TFIDF score of the normalized data 230 and may retrieve a cluster of rules data comprising only those nodes where the calculated TFIDF score exceeds the TFIDF score threshold.

Step 214 may include rules engine 120 pruning the cluster of rules data 232 based on the user persona. For example, if the user persona indicates the user device 106 is running a first operating system, the rules engine 120 will not return any nodes related to a second operating system. In another example, if the user persona indicates the user device 106 comprises a first hardware element, the rules engine 120 will not return any nodes related to a second hardware element. In yet another example, if the user persona indicates the user device 106 is running a first application, the rules engine will not return nodes related to a second application. In this regard, the cluster of rules data 232 may be selected based on the TFIDF scores and the user persona.

In various embodiments, the system may determine a dispositioned outcome based on the set of support rules and the first user intent. More particularly, information support system 118 may select a node from the cluster of rules data 232. Information support system may apply a selection algorithm to the cluster of rules data 232 (step 216). The selection algorithm may include machine learning techniques, Minimum Spanning Tree (MST), Euler path, Hamilton path, Finding Nearest Neighbor (e.g. k-NN, weighted k-NN, etc.), clustering, graph traversal, and/or other algorithms. Step 216 includes calculating a relatedness score for reach of the nodes of the cluster of rules data 232. Information support system 118 may select the node based on the output of the selection algorithm (step 218) such as, for example, the relatedness score. Step 218 may include the information support system 118 selecting the node based on the relatedness score, a distance from the nearest neighbor, confusion matrix and/or cross validation techniques (adversarial, k-fold, etc.). In various embodiments, the selection radius of a Nearest Neighbor algorithm may be configured based on N-gram, frequency, and/or the normalized data 230. As such, the selection algorithm may be a function of the user intent.

The system may return the dispositioned outcome. The dispositioned outcome may be determined based on the selected node. Information support system 118 may compare the relatedness score of the selected node to a threshold value and determine whether the relatedness score of the selected node exceeds the threshold value (step 220). When the information support system determines the relatedness score does not exceed the threshold value, the information support system 118 may return a default response message to user device 106 (step 222). For example, a default response message may be of the form, "I am sorry I am not able to understand your query, please click this link to connect with a support technician." Step 222 may include a default message prompting for a restated information support request (i.e., a second information support request) and determining a second user intent. Stated another way, the process may reset or repeat if a dispositioned outcome is not reached. When the information support system determines the relatedness score exceeds the threshold value, the information support system 118 may return the selected node data (step 224).

The disclosure and claims do not describe only a particular outcome of natural language processing for information support, but the disclosure and claims include specific rules for implementing the outcome of selecting and presenting nodes and that render information into a specific format that is then used and applied to create the desired results of providing information support in response to a natural language support request, as set forth in *McRO, Inc. v. Bandai Namco Games America Inc.* (Fed. Cir. case number 15-1080, Sep. 13, 2016). In other words, the outcome of selecting and presenting nodes can be performed by many different types of rules and combinations of rules, and this disclosure includes various embodiments with specific rules. While the absence of complete preemption may not guarantee that a claim is eligible, the disclosure does not sufficiently preempt the field of natural language processing at all. The disclosure acts to narrow, confine, and otherwise tie down the disclosure so as not to cover the general abstract idea of just natural language processing. Significantly, other systems and methods exist for natural language processing, so it would be inappropriate to assert that the claimed invention preempts the field or monopolizes the basic tools of natural language processing. In other words, the disclosure will not prevent others from natural language processing, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

In various embodiments, software may be stored in a computer program product and loaded into a computer system using removable storage drive, hard disk drive, or communications interface. The control logic (software), when executed by the processor, causes the processor to perform the functions of various embodiments as described herein. In various embodiments, hardware components may take the form of application specific integrated circuits (ASICs). Implementation of the hardware state machine so as to perform the functions described herein will be apparent to persons skilled in the relevant art(s).

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY DISC®, optical storage devices, magnetic storage devices, and/or the like.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. For a basic introduction of cryptography and network security, see any of the following references: (1) "Applied Cryptography: Protocols, Algorithms, And Source Code In C," by Bruce Schneier, published by John Wiley & Sons (second edition, 1995): (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2A and 2B the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2A and 2B, but also to the various system components as described above with reference to FIG. 1. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERES MQ™ (formerly MQSeries) by IBM®, Inc. (Armonk, N.Y.) is an example of a commercially available middleware product. An Enterprise Service Bus ("ESB") application is another example of middleware.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

For the sake of brevity, conventional data networking, application development, and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

In various embodiments, the system and various components may integrate with one or more smart digital assistant technologies. For example, exemplary smart digital assistant technologies may include the ALEXA® system developed by the AMAZON® company, the GOOGLE HOME® system developed by Alphabet, Inc., the HOMEPOD® system of the APPLE® company, and/or similar digital assistant technologies. The ALEXA® system, GOOGLE HOME® system, and HOMEPOD® system, may each provide cloud-based voice activation services that can assist with tasks, entertainment, general information, and more. All the ALEXA® devices, such as the AMAZON ECHO®, AMAZON ECHO DOT®, AMAZON TAP®, and AMAZON FIRE® TV, have access to the ALEXA® system. The ALEXA® system, GOOGLE HOME® system, and HOMEPOD® system may receive voice commands via its voice activation technology, activate other functions, control smart devices, and/or gather information. For example, the smart digital assistant technologies may be used to interact with music, emails, texts, phone calls, question answering, home improvement information, smart home communication/activation, games, shopping, making to-do lists, setting alarms, streaming podcasts, playing audiobooks, and providing weather, traffic, and other real time information, such as news. The ALEXA®, GOOGLE HOME®, and HOMEPOD® systems may also allow the user to access information about eligible transaction accounts linked to an online account across all digital assistant-enabled devices.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.).

Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of communications interface may include a modem, a network interface (such as an Ethernet card), a communications port, a Personal Computer Memory Card International Association (PCMCIA) slot and card, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16-bit integers.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The various system components may be independently, separately, or collectively suitably coupled to the network via data links which includes, for example, a connection to an Internet Service Provider (ISP) over the local loop as is typically used in connection with standard modem communication, cable modem, DISH NETWORK®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale, or distribution of any goods, services, or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts, See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server, any other application server components or may reside within another computing device or may take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODBO, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets: using data sets stored in individual files using a hierarchical filing system: data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at www.csrc.nist.gov/publications/nistpubs/800-145/SP800-145 (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word' or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

The invention claimed is:

1. A method, comprising:
   receiving a natural language information support request from a client device;
   determining a user intent based on the information support request by at least:
      extracting recognizable parts of speech;
      preprocessing the recognizable parts of speech to generate preprocessed parts of speech; and
      calculating a first Term Frequency-Inverse Document Frequency (TFIDF) score for the preprocessed parts of speech;
   determining a dispositioned outcome based at least in part on a comparison of the user intent with a set of support rules; and
   returning the dispositioned outcome to the client device.

2. The method of claim 1, wherein the comparison of the user intent with the set of support rules further comprises:
   calculating a second TFIDF score for each word of each of a first plurality of root nodes and each of a corresponding first plurality of branch nodes of the set of information support rules; and
   comparing the first TFIDF score of the preprocessed parts of speech with each of the second TFIDF scores of each of the first plurality of root nodes and each of the corresponding first plurality of branch nodes.

3. The method of claim 1, wherein the natural language information support request is received through a plain text input channel.

4. The method of claim 1, further comprising retrieving a cluster of rules data comprising a second plurality of root nodes and a second plurality of branch nodes.

5. The method of claim 4, further comprising:
   extracting a user persona from the client device; and
   pruning the cluster of rules data based at least in part on the user persona.

6. The method of claim 5, wherein the determining the dispositioned outcome based at least in part on the comparison of the set of support rules with the user intent comprises:
   applying a selection algorithm to the cluster of rules data;
   calculating a relatedness score for each of the second plurality of root nodes and the second plurality of branch nodes of the cluster of rules data based on the selection algorithm; and
   selecting a node from the cluster of rules data based on at least one of the selection algorithm and a relatedness score of the selected node.

7. The method of claim 6, wherein the returning the dispositioned outcome to the client device comprises:
   comparing the relatedness score of the selected node to a relatedness threshold; and
   returning to the client device at least one of the selected node data or a default response based on the comparison.

8. A system comprising:
   a computing device comprising a processor and a memory; and
   machine-readable instructions stored in the memory that, when executed by the processor, cause the computing device to at least:
      receive a natural language information support request from a client device;
      determine a user intent based on the information support request by at least:
         extract recognizable parts of speech;
         preprocess the recognizable parts of speech to generate preprocessed parts of speech; and
         calculate a first Term Frequency-Inverse Document Frequency (TFIDF) score for the preprocessed parts of speech;
      determine a dispositioned outcome based at least in part on a comparison of the user intent with a set of support rules; and
      return the dispositioned outcome to the client device.

9. The system of claim 8, wherein the comparison of the user intent with the set of support rules further comprises:
   a calculation of a second TFIDF score for each word of each of a first plurality of root nodes and each of a corresponding first plurality of branch nodes of the set of information support rules; and
   a comparison of the first TFIDF score of the preprocessed parts of speech with each of the second TFIDF scores of each of the first plurality of root nodes and each of the corresponding first plurality of branch nodes.

10. The system of claim 8, wherein the natural language information support request is received through a plain text input channel.

11. The system of claim 8, wherein the machine-readable instructions, when executed by the processor, further cause the computing device to at least retrieve a cluster of rules data comprising a second plurality of root notes and a second plurality of branch nodes.

12. The system of claim 11, wherein the machine-readable instructions, when executed by the processor, further cause the computing device to at least:
   extract a user persona from the client device; and prune the cluster of rules data based at least in part on the user persona.

13. The system of claim 12, wherein the machine-readable instructions that cause the computing device to determine the dispositioned outcome based at least in part on the comparison of the set of support rules with the user intent further cause the computing device to at least:
   apply a selection algorithm to the cluster of rules data;
   calculate a relatedness score for each of the second plurality of root nodes and the second plurality of branch nodes of the cluster of rules data based on the selection algorithm; and
   select a node from the cluster of rules data based on at least one of the selection algorithm and a relatedness score of the selected node.

14. The system of claim 13, wherein the machine-readable instructions that cause the computing device to return the dispositioned outcome to the client device further cause the computing device to at least:
   compare the relatedness score of the selected node to a relatedness threshold; and
   return to the client device at least one of the selected node data or a default response based on the comparison.

15. A non-transitory, computer-readable medium comprising machine-readable instructions that, when executed by a processor of a computing device, cause the computing device to at least:
   receive a natural language information support request from a client device;
   determine a user intent based on the information support request by at least:
      extract recognizable parts of speech;
      preprocess the recognizable parts of speech to generate preprocessed parts of speech; and
      calculate a first Term Frequency-Inverse Document Frequency (TFIDF) score for the preprocessed parts of speech;
   determine a dispositioned outcome based at least in part on a comparison of the user intent with a set of support rules; and
   return the dispositioned outcome to the client device.

16. The non-transitory, computer-readable medium of claim 15, wherein the comparison of the user intent with the set of support rules further comprises:
   a calculation of a second TFIDF score for each word of each of a first plurality of root nodes and each of a corresponding first plurality of branch nodes of the set of information support rules; and
   a comparison of the first TFIDF score of the preprocessed parts of speech with each of the second TFIDF scores of each of the first plurality of root nodes and each of the corresponding first plurality of branch nodes.

17. The non-transitory, computer-readable medium of claim 15, wherein the machine-readable instructions, when executed by the processor, further cause the computing device to at least retrieve a cluster of rules data comprising a second plurality of root notes and a second plurality of branch nodes.

18. The non-transitory, computer-readable medium of claim 17, wherein the machine-readable instructions, when executed by the processor, further cause the computing device to at least:
   extract a user persona from the client device; and
   prune a cluster of rules data based at least in part on the user persona.

19. The non-transitory, computer-readable medium of claim 18, wherein the machine-readable instructions that cause the computing device to determine the dispositioned outcome based at least in part on the comparison of the set of support rules with the user intent further cause the computing device to at least:
   apply a selection algorithm to the cluster of rules data;
   calculate a relatedness score for each of the second plurality of root nodes and the second plurality of branch nodes of the cluster of rules data based on the selection algorithm; and
   select a node from the cluster of rules data based on at least one of the selection algorithm and a relatedness score of the selected node.

20. The non-transitory, computer-readable medium of claim 19, wherein the machine-readable instructions that cause the computing device to return the dispositioned outcome to the client device further cause the computing device to at least:
   compare the relatedness score of the selected node to a relatedness threshold; and
   return to the client device at least one of the selected node data or a default response based on the comparison.

* * * * *